United States Patent [19]

Beckes et al.

[11] Patent Number: 4,672,558

[45] Date of Patent: Jun. 9, 1987

[54] TOUCH-SENSITIVE DATA INPUT DEVICE

[75] Inventors: Jerome F. Beckes; Steven P. Kadner, both of Albuquerque, N. Mex.; Miquel A. Franco; Robert G. Campos, both of El Paso, Tex.

[73] Assignee: Aquila Technologies Group, Inc., Albuquerque, N. Mex.

[21] Appl. No.: 653,906

[22] Filed: Sep. 25, 1984

[51] Int. Cl.[4] .............................................. G08C 21/00
[52] U.S. Cl. ............................... 364/518; 340/365 P; 340/712; 340/718
[58] Field of Search ................ 364/518, 559, 709, 556; 340/365 P, 712, 706, 718, 365 R, 365 C, 365 VL; 178/18

[56] References Cited

U.S. PATENT DOCUMENTS

| 3,673,327 | 6/1972 | Johnson et al. ........................ 178/18 |
| 3,673,579 | 6/1972 | Graven .................................. 340/173 |
| 3,932,862 | 1/1976 | Graven .................................. 340/324 |
| 4,198,623 | 4/1980 | Misek et al. ...................... 340/365 P |
| 4,205,304 | 5/1980 | Moore ................................. 340/365 |
| 4,427,861 | 1/1984 | Stillie et al. ................... 340/365 VL |
| 4,517,559 | 5/1985 | Deitch et al. ....................... 340/712 |
| 4,550,384 | 10/1985 | Kimura ............................... 364/556 |

FOREIGN PATENT DOCUMENTS

55-110330  8/1980  Japan ..................................... 178/18

Primary Examiner—Errol A. Krass
Assistant Examiner—Gregory M. Doudnikoff
Attorney, Agent, or Firm—Arnold, White & Durkee

[57] ABSTRACT

A touch-sensitive data input device for use with a computer system having a display screen has a demountable bezel which establishes a grid of light beams in front of the display screen. Misalignment between the display screen frame of reference and the bezel frame of reference is corrected by the calculation of coordinate transforms which are applied to bezel grid coordinates to translate same to display screen coordinates. The coordinate transforms are generated by the computer in accordance with a program of instructions executed in a preliminary bezel alignment procedure.

9 Claims, 7 Drawing Figures

LOGIC TABLE FOR HEXADECIMAL COUNT

TOUCH-SENSITIVE DATA INPUT DEVICE

BACKGROUND OF THE INVENTION

This invention relates generally to data input devices and particularly to touch-sensitive apparatus used in conjunction with computer data display screens.

Interactive computer systems usually require an operator to observe data displays on a cathode ray tube or other display screen and to enter data on a keyboard. While keyboards are suitable for entry of large amounts of character-oriented data, they have disadvantages in many applications—especially those contemplated for microcomputers. Keyboards require training for efficient use and many microcomputer users have not had such training, nor are they inclined to take it. Moreover, with a keyboard, the data display and data entry functions are separated both spatially and conceptually. It is sometimes difficult for an operator to associate display and input functions in a natural way when they are separated by such a physical and perceptual distance.

Touch-sensitive display screens have been proposed to alleviate the problems of using keyboards for data entry in some applications. Typically such screens consist of a plurality of light emitters and detectors arranged around the sides of the display screen so that they cover the display surface with crossed light beams. Touching the display surface with a finger or pointer breaks one or more of the beam allowing the apparatus to calculate the position of the touch. In an interactive computer system, therefore, the computer can display information on the screen and the operator can make selections, confirm data or otherwise input data by touching the appropriate point on the screen.

Such an apparatus requires carefully collimated light beams in order to provide unambiguous position measurement. Such collimation requires bulky optical arrangements that limited acceptance of light beam touch screens. To eliminate the requirement for collimation, only a few, widely separated light beams in each orthogonal direction are energized at a time. This is done by enabling the emitters and detectors by pairs in sequence. If this is done quickly enough, the effect is the same as if a grid of beams covers the screen continuously.

In this type of apparatus, accurate position sensing depends on the accurate and unchanging spatial relationships between emitters, detectors and the display screen. Once the apparatus has been calibrated, the user must be confident that these relationships cannot change significantly over time. This typically has meant that the touch detecting apparatus must be built into the display screen housing. While this is satisfactory in many applications, users who already have display screens without touch-sensitive input capability cannot have the benefit of such data input means without replacing their display screens. In addition, the touch-sensitive input apparatus cannot be removed easily for cleaning and maintenance.

Further, to maintain the alignment of the emitters and detectors, they have been rigidly attached to a sheet of transparent material which is mounted in front of the display screen and through which the beams propagate. While this avoids the problem of misalignment, it does so at the cost of interposing a material between the display screen and then observed with the consequent possible loss of brightness and contrast.

SUMMARY OF THE INVENTION

The present invention provides a touch-sensitive data input device for use with a computer system having a display screen. The device includes a demountable bezel for establishing a grid of light beams in front of the display screen. As used herein, the term "demountable" means that the bezel is not built into the display screen housing, but rather it is removable from one display screen and can be mounted to a different display screen or remounted to the same display screen.

The device also includes means for determining the grid coordinates of an object placed proximate the face of the display screen to interrupt the light beam grid and thereby mark a spot on the screen, and means coupled to the grid coordinate determining means for reporting the grid coordinates to a central processing unit of the computer system.

The problem of misalignment of the bezel light beam grid coordinates and the display screen coordinates is overcome by provision of an alignment routine executed by the computer in which coordinate transforms are generated to translate bezel light beam coordinates to display screen coordinates. This is accomplished by the CPU of the computer system under the direction of a program of instruction stored in memory and involves displaying a spot on the display screen at a location with known coordinates and the frame of reference of the display screen; accessing the bezel grid coordinates generated by an interruption of the light beam grid by an object placed at the location of the spot on the display screen, to obtain coordinates of the spot in the frame of reference of the bezel grid; and calculating coordinate transforms to be applied to the bezel grid coordinates to effectively align the bezel frame of reference to the display screen frame of reference.

BRIEF DESCRIPTION OF THE DRAWINGS

A written description setting forth the best mode presently known for carrying out the present invention, and of the manner of implementing and using it, is provided by the following detailed description of a preferred embodiment illustrated in the attached drawings wherein.

DETAILED DESCRIPTION

A. Bezel Assembly

Touch-sensitive apparatus in accordance with the present invention generally includes a bezel assembly, a bezel controller and a program of instructions for directing a computer in the execution of a bezel alignment procedure in which position coordinate transforms are generated to translate bezel grid coordinates to display screen coordinates.

Figure 1:
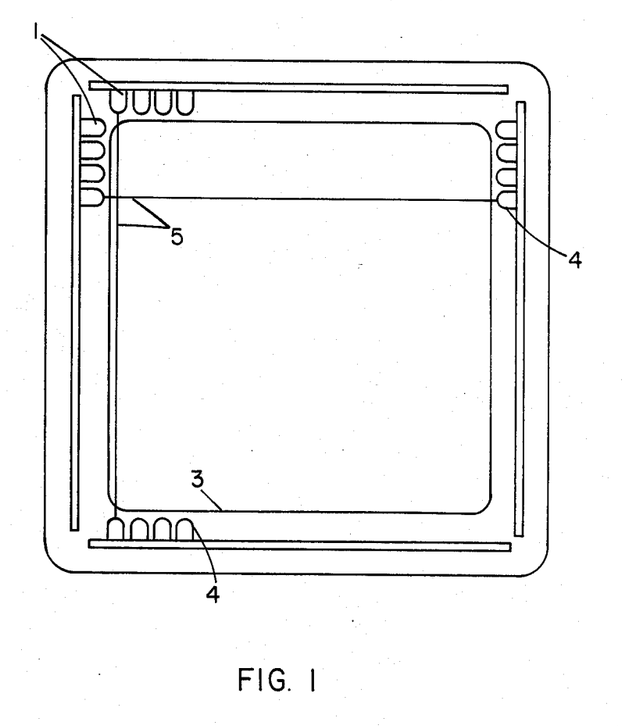
FIG. 1 is an overall view of an embodiment of the touch-sensitive device's bezel assembly of the present invention.

FIG. 1 shows light-emitting diodes or other light emitters 1 arranged along the sides of a rectangular bezel 2 mounted on a computer display device 3. Phototransistors or other light detectors 4 are mounted on opposing sides of the bezel. The emitters and detectors are illuminated in sequence to form light beams 5 that cross the display surface in the X and Y directions to form a grid pattern. Touching the display surface with a pointer or the operator's finger breaks one or more of these beams in each direction, allowing the touch-detecting logic to determine the position of the touch.

Figure 2:
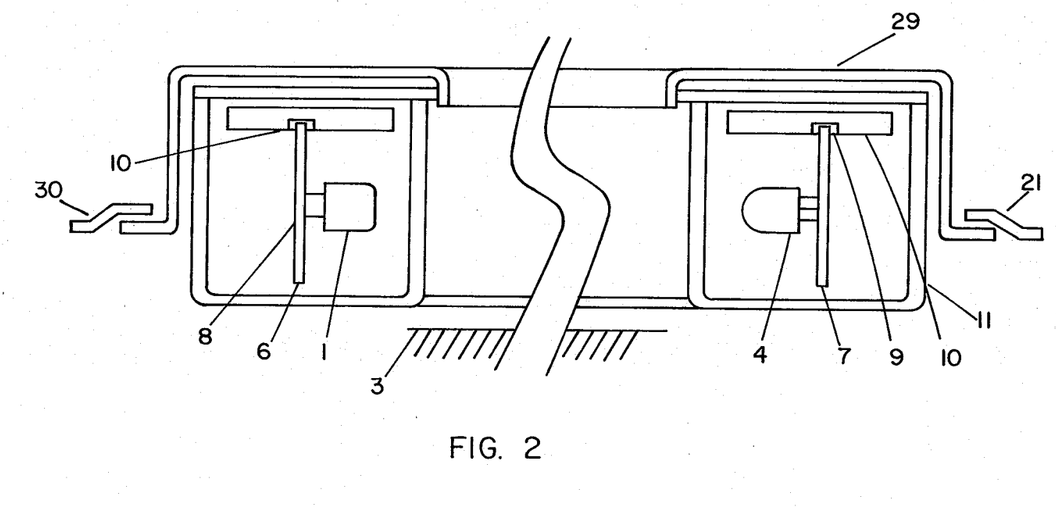
FIG. 2 is a cross-section of the bezel assembly illustrating the mounting of light-emitting diodes and detectors on opposite sides of a computer display screen.

In FIG. 2, an emitter 1 and a detector 4 are shown opposing each other across the display surface 3. The emitters and detectors are mounted mechanically and electrically on printed circuit board strips 6 and 7 that are in turn affixed in grooves 8 and 9 in a rigid frame 10. This arrangement of orthogonal mounting planes provides the rigidity and dimensional stability required for demountable operation. The bezel cover 11 is made of a material, for example smoked LEXAN® plastic, whose light transmission spectrum is matched to the emission spectrum (930 nanometers) of the emitters. In this way, the effects of ambient light on the operation of the apparatus is minimized. The bezel assembly is held against the display surface by a frame 29 that attaches to the front of the display screen housing by means of clips 30 or screws. Such clips are commonly found on display screen devices as a means of mounting a shield or glare filter. The touch-sensitive data input device replaces the shield or glare filter on such a screen. In the absence of such clips, the frame can be drilled to accept screws or other fasteners.

B. Bezel Controller

Figure 3:
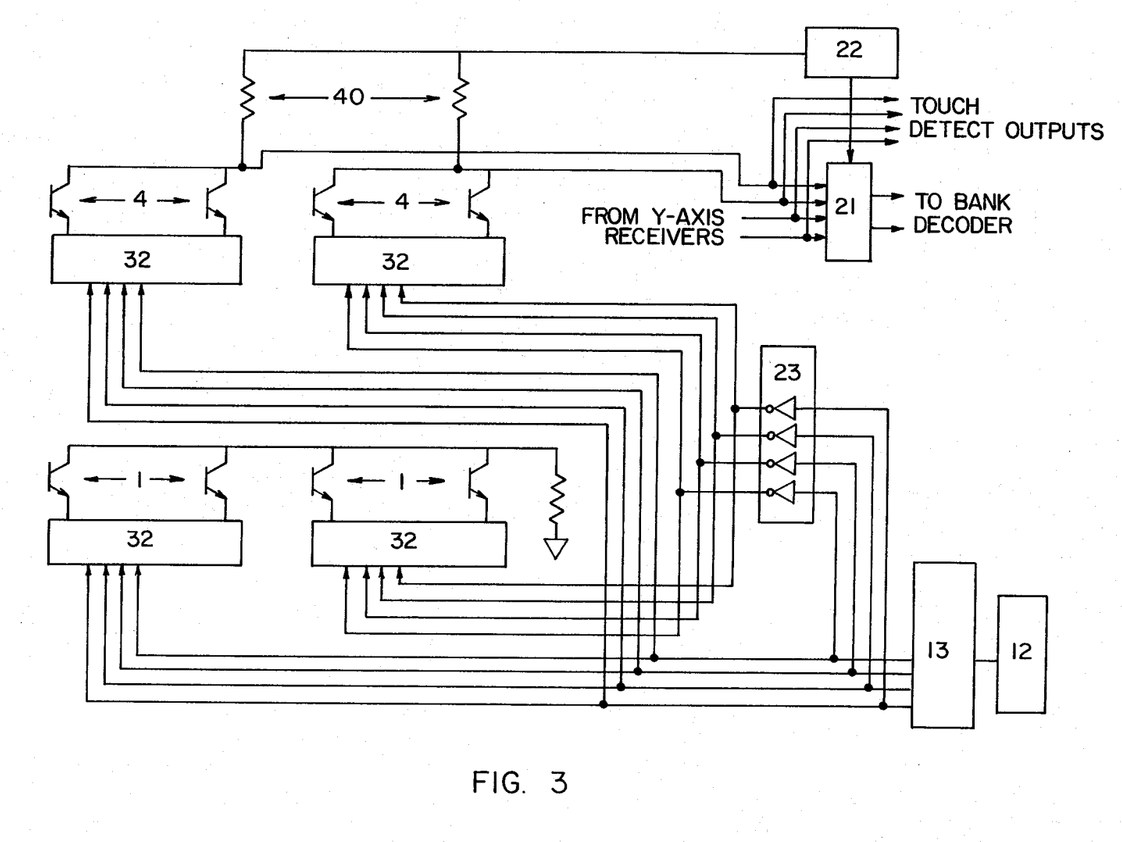
FIG. 3 is a diagram of circuitry that drives the light-emitting diodes and enables the detectors in the bezel.
Figure 4:
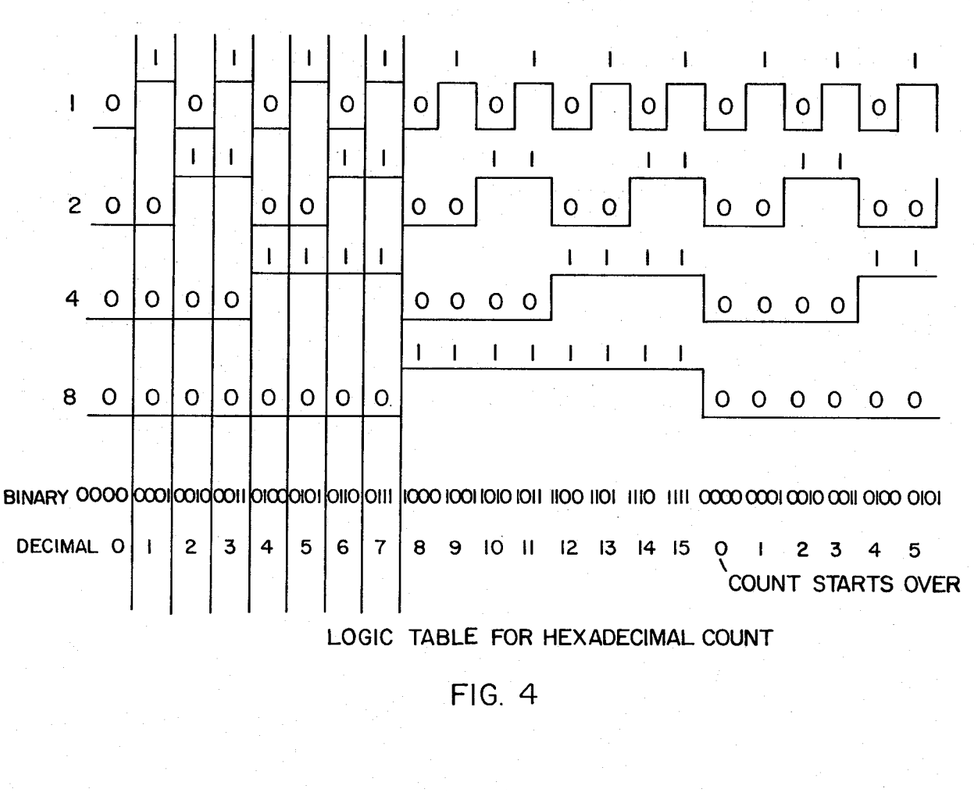
FIG. 4 is a timing diagram showing the output of the counter in the bezel driver circuitry.

In FIG. 3, a free running clock 12 drives a counter 13 that supplies bit patterns to the bezel. The output of the counter as a function of time is shown in FIG. 4. Multiple sets of decoders 14 illuminate one emitter for each distinct bit pattern from the counter. Emitters on the X and Y axes are illuminated simultaneously.

At the same time, the counter drives other sets of decoders 15 that enable the detectors 4 corresponding to the illuminated emitters. FIG. 3 shows only the decoders, emitters and detectors along the X direction, but the same arrangement is provided along the Y direction, as well. The decoders, emitters and detectors in the Y direction are driven by the counter in parallel with those in the X direction. In this way, light beams 5 are created that scan across the display screen in the X and Y directions. FIG. 3 shows two groups of decoders, emitters and detectors along each axis, allowing two emitter/detector pairs to be active at one time. In principle, any number of such groups can be provided, as long as the light beams from one group do not interfere with the detectors of another group. Multiple scanning of the display surface allows the scanning period (and thus the time delay between the touch and its detection by the apparatus) to be made essentially independent of the size of the display and the number of emitter/detector pairs used.

Figure 5:
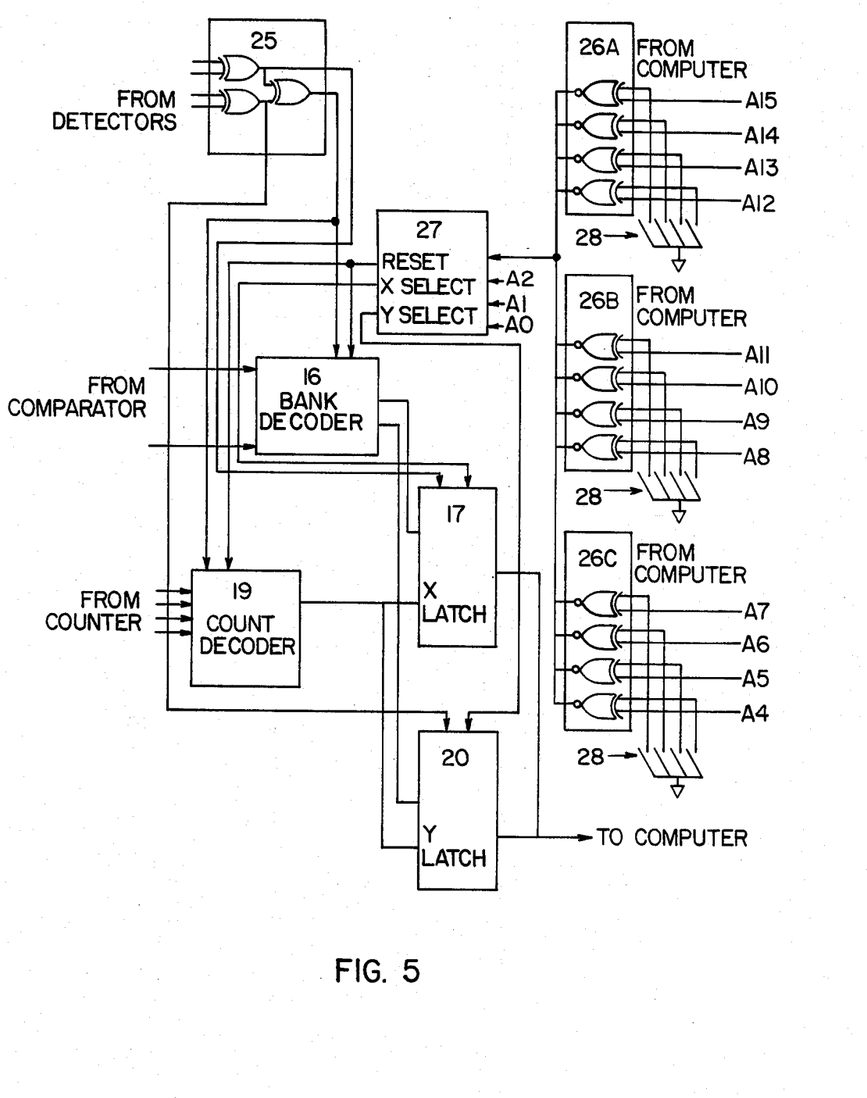
FIG. 5 is a block diagram of the circuitry that decodes the position of the touch and reports it to the computer.

In FIG. 5, reduction of the light level at a detector (because the beam from its associated emitter has been blocked by the operator's finger or other object) causes a signal on one of the X or Y output lines. This output signal, along with the current state of the counter, is applied to encoders 16 that calculate the unique X and Y addresses of the touch. When any of the X outputs are active, the current value of the encoded touch position is stored by the X-latch 17 where it can be read by the computer 18. A Y output signal causes the Y-latch 19 to store the Y address of the touch.

The latches hold the current addresses until reset by command from the computer. The computer interrogates the touch-sensitive data input device by presenting an address signal on address lines A0 through A15. Exclusive OR gates 26 determine whether the twelve most significant bits of the address is the same as the address set by the address switches in the touch-sensitive screen apparatus 28. If they are the same, a data selector 27 is enabled and decodes the least significant three bits of the address to determine the function. If A2 is logical "1", the reset output clears the bank decoder 16 and count detector 19, readying them for another touch. If A1 is "1", the X-select enables the X-coordinate latch and allows the computer to read the X-coordinate. Similarly, if A2 is "1", the Y-select allows the computer to read the Y-coordinate.

C. Operation and Use of Touch-Sensitive Device

Figure 6:
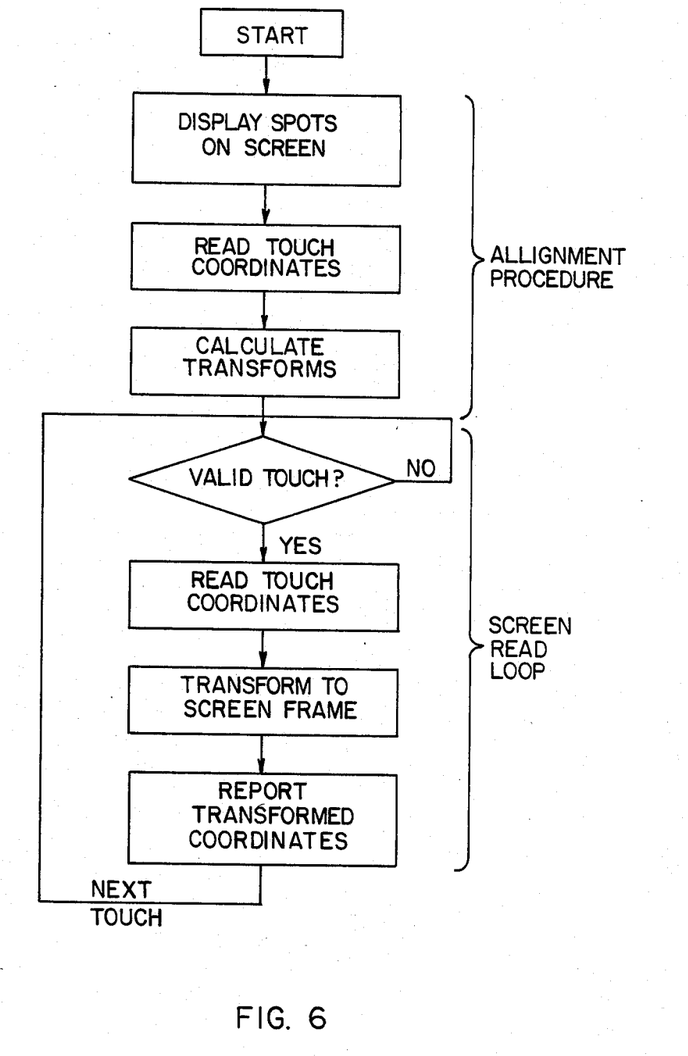
FIG. 6 is a flow chart of the algorithm used to align the bezel on the screen for accurate and repeatable position encoding.
Figure 7:
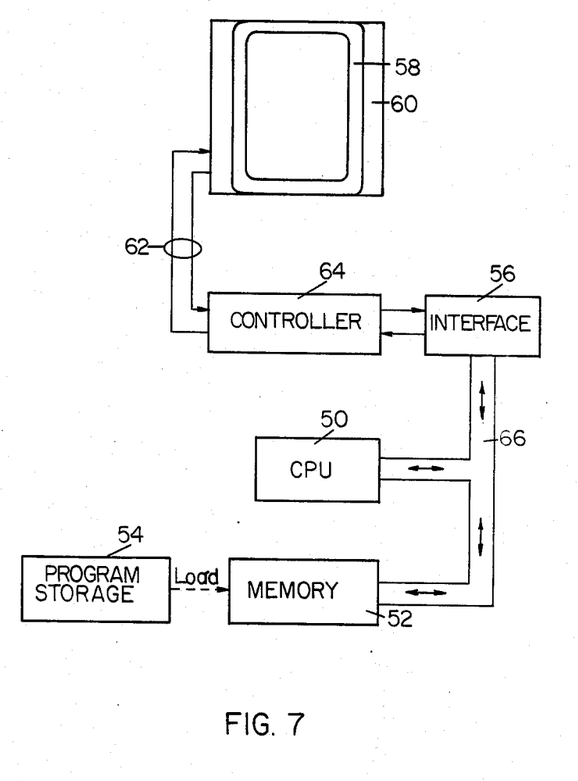
FIG. 7 is a diagram of a computer system illustrating use of the touch-sensitive data input device.

Referring to FIG. 7, to use the touch-sensitive data input device, a computer system, which includes a central processing unit (CPU) 50, first loads the bezel alignment program into memory into memory 502 from program storage medium 54. The alignment algorithm is diagrammed in FIG. 6. In current embodiments of the device, this algorithm is stored on a floppy diskette and is read into the computer's memory on command. Alternatively, the program can be stored in a programmable read-only memory (ROM) located on the touch-sensitive data input device's interface board 56.

The bezel assembly 58 is shown mounted on display screen 60 of the computer system. A cable 62 connects the bezel assembly to the bezel controller 64, which is in turn coupled to the computer system buss 66 by interface 56. The computer system may be APPLE® II series computer, IBM® Personal Computer or computers with similar structure and function.

The bezel alignment in accordance with the routine of FIG. 6 begins by displaying a spot on the computer's display screen 60 at a location with known coordinates in the display screen's frame of reference. It also displays a message asking the operator to touch the spot with a pointer.

In the manner discussed above, the touch-sensitive data input device determines the coordinates of the operator's touch in its own frame of reference. The device is so arranged that the contents of the X-latch 17 and Y-latch 20 have the same, quiescent value before the operator touches the screen. In the eight output bits of the latches in the ON state (binary value "1"). When the output values differ from "255", the alignment routine assumes that the screen has been touched and retrieves the X and Y coordinates of the touch from the data input device interface circuitry.

Since the touch-sensitive data input device is designed to work in conjunction with the display screen, the alignment routine calculates the coefficients necessary to transform the coordinates from the data input device into the frame of reference of the display screen. The algorithm computes coordinate transforms of the form $$C_x = mS_x + b$$

and $$C_y = m'S_y + b'$$

where $C_x$ and $C_y$ are the x and y coordinates of the touch in display screen coordinates, m and m' are the x and y scale factors and b and b' are the x and y offsets. By substituting the known coordinates of the displayed spot and the measured coordinates of the touch, the alignment routine calculates the scale factors and offsets required to transform any touch coordinates into screen coordinates.

From this point on, the data input device is ready for use. The alignment routine detects valid touches by determining when the data input device's outputs differ from "255". The coordinates relative to the input device's frame of reference are then retrieved and transformed into the screen's frame of reference. This has the effect of allowing application software that uses the touch-sensitive data input device to work entirely in screen coordinates for both output and input. It also compensates for misalignment between the data input device and the display screen, allowing for demountable operation.

D. Bezel Alignment Program Listings

The alignment routine is shown in the program listings that follow. The first listing is of the program that displays messages and the alignment spot for the operator. This program is written in Basic for the APPLE II ® series computer. Versions for other computers are readily producable by practitioners skilled in the art. The second listing is of an assembly language program that reads the coordinates of the touch and transforms the coordinates.

D. Bezel Alignment Program Listings

The alignment routine is shown in the program listings that follow. The first listing is of the program that displays messages and the alignment spot for the operator. This program is written in Basic for the APPLE II® series computer. Versions for other computers are readily producable by practitioners skilled in the art. The second listing is of an assembly language program that reads the coordinates of the touch and transforms the coordinates.

Program Listing 1

```
5      PRINT CHR$ (4)"BLOAD CAL"
10     HOME
20     VTAB 7
30     HTAB 15
40     PRINT "CTA TOUCH BEZEL"
50     VTAB 9
60     FLASH
70     HTAB 13
80     PRINT "CALIBRATION PROGRAM"
85     NORMAL : PRINT
90     HTAB 8
100    PRINT "CREATED BY CTA SYSTEMS GROUP"
110    FOR I = 1 TO 2000: NEXT
120    HOME
130    PRINT "THIS IS AN ALIGNMENT ROUTINE FOR THE ";
135    SPEED= 125
140    PRINT "CTATOUCH BEZEL.FIRST TRY TO CENTER THE BEZEL WITH
       THE VELCRO STRIPS.."
145    FOR I = 1 TO 2000: NEXT
150    FLASH : PRINT : PRINT "REMEMBER!!": NORMAL : PRINT "THE
       CABLE SHOULD BE BOTTOM LEFT"
155    FOR I = 1 TO 2000: NEXT
160    PRINT " FLASH : PRINT "THEN": NORMAL
```

```
165   · PRINT "FOLLOW THE PROMPTS TO ALIGN THE BEZEL..."
168     FOR I = 1 TO 2000: NEXT
170     PRINT : PRINT "AFTER THE BEZEL IS ALIGNED- THEN MAKE SURE
        THAT IT IS SECURED WELL."
174     SPEED= 255
175     VTAB 22: HTAB 10: PRINT "PRESS RETURN TO CONTINUE..";
180     INPUT "";A$
190     FOR I = 1 TO 1000: NEXT
199     REM DISPLAY THE ALIGNMENT GRAPH'
200     A = PEEK (49236)
210     A = PEEK (49235)
220     A = PEEK (49239)
230     A = PEEK (49232)
250     GOSUB 3000
260     PRINT "TOUCH LOCATION 1"
270     VY = 13:VX = 15
280     REM PUT VY VALUE HGOSUB 3000
310     PRINT "TOUCH LOCATION 2"
320     VX = 21:VT = 13
330     REM VY VALUE GOES HERE
340     GOSUB 10000
350     HOME : FOR I = 1 TO 1000: NEXT
400     GOSUB 3000
405     PRINT "TOUCH LOCATION 3"
410     VX = 10:VY = 13
420     REM VY VALUE GOES HERE
430     GOSUB 10000
440     HOME : FOR I = 1 TO 1000: NEXT
500     GOSUB 3000
510     VX = 15:VY = 20
520     REM VY VALUE GOES HERE
530     GOSUB 10000
600     GOSUB 3000
601     GOTO 910
605     PRINT "TOUCH LOCATION 5"
610     REM VX VALUE GOES HERE
620     REM VY VALUE GOES HERE
630     GOSUB 10000
700     GOSUB 3000
710     PRINT "TOUCH LOCATION 6"
720     REM VX VALUE REM VY VALUE GOES HERE
840     GOSUB 10000
910     TEXT : HOME
920     PRINT "THE BEZEL IS NOW ALIGNED. FASTEN IT WELLAND TRY NOT
        TO MOVE IT."
922     FOR I = 1 TO 500
923     NEXT I
925     PRINT CHR$ (4);"RUN HELLO"
930     END
3000    HOME : VTAB 22: HTAB 12
3001    RETURN
9000    X = PEEK (49298)
9010    Y = PEEK (49297)
9020    X = PEEK (49296)
9030    IF X = 255 THEN 9010
9040    IF Y = 255 THEN 9010
9046    VTAB 21: PRINT "                    "
9047    VTAB 22: PRINT "                    "
9050    RETU VY THEN GOSUB 12040
10050   IF X = VX AND Y = VY THEN RETURN
```

```
10060      GOTO 10000
12000      VTAB 21
12010      PRINT "MOVE RIGHT"
12015      RETURN
12020      VTAB 21
12027      PRINT "MOVE LEFT "
12028      RETURN
12030      VTAB 22
12032      PRINT "MOVE UP   "
12035      RETURN
12040      VTAB 22
12043      PRINT "MOVE DOWN"
12045      RETURN
```

Program Listing 2

```
1000  *                              BEZEL ALIGNMENT
1010         .OR  $1300
1015         .TA  $0300
1020  A1L    .EQ  $003C
1030  A1H    .EQ  $003D
1040  A2L    .EQ  $003E
1050  A2H    .EQ  $003F
1060  A4L    .EQ  $0042
1070  A4H    .EQ  $0043
1080  XCOR   .EQ  $0478
1090  YCOR   .EQ  $04F8
1100  XOFF   .EQ  $0578
1110  YOFF   .EQ  $05F8
1120  SYNC   .EQ  $0678
1130  TEMP   .EQ  $06F8
1140  RSET   .EQ  $C082
1150  XBEZ   .EQ  $C081
1160  YBEZ   .EQ  $C080
1170  GRON   .EQ  $C050
1180  HRON   .EQ  $C057
1190  PAGE   .EQ  $C054
1200  NMIX   .EQ  $C052
1210  WAIT   .EQ  $FCA8
1220  MOVE   .EQ  $FE2C
1230  RTIO   .EQ  $FF3F
1240  STIO   .EQ  $FF4A
1250  BELL   .EQ  $FBDD
1260  *                              START
1270         LDA  GRON               GRAPHICS ON
1280         LDA  HRON               HI-RES ON
1290         LDA  PAGE               SET PAGE 1
1300         LDA  NMIX               NO TEXT MIX
1310         JSR  SFIN               FIND SLOT
1320         LDY  #$00
1330  A      LDA  #$FF
1340         STA  SYNC,X             SET NO OFFSET
1350         LDA  #$00
1380         STA  A1L
1390         STA  A2L
1400         STA  A4L
1410         LDA  #$40
1420         STA  A1H
1430         LDA  #$60
1440         STA  A2H
```

```
1450        LDA  #$20
1460        STA  A4H
1470        JSR  MOVE
1480        JSR  $1F00      GET X,Y
1490        LDA  #$0D       LOADS CALX VAL
1500        SEC
1510        SBC  XCOR,X
1520        STA  XOFF,X
1530        LDA  #$0F       LOAD CALY VAL
1540        SEC
1550        SBC  YCOR,X
1560        STA  YOFF,X
1570        LDA  #$00
1580        STA  SYNC,X     SET SYNC BYTE
1590        STA  A1L
1600        STA  A2L
1610        STA  A4L
1620        LDA  #$60
1630        STA  A1H
1640        LDA  #$80
1650        STA  A2H
1660        LDA  #$20
1670        STA  A4H
1680        JSR  MOVE
1690        RTS
1700 SFIN   LDX  #$00
1710 LOOP   INX
1720        CPX  #$10
1730        BEQ  PROB
1740        TXA
1750        ASL
1760        ASL
1770        ASL
1780        ASL
1790        TAY
1800        LDA  RSET,Y
1810        LDA  XBEZ,Y
1820        CMP  #$FF
1830        BNE  LOOP
1840        LDA  YBEZ,Y
1850        CMP  #$FF
1860        BNE  LOOP
1870        STX  $1F04
1880        RTS
```

The foregoing description of the invention has been directed to a particular preferred embodiment for purposes of explanation and illustration. It is will be apparent, however, to those skilled in this art that many modifications and changes may be made without departing from the essence of the invention. It is the Applicant's intention in the following claims to cover all equivalent modifications and variations as fall within the scope of the invention.

What is claimed is:

1. A touch-sensitive data input device for use with a computer system having a central processing unit (CPU), a memory accessed by the CPU, and a display screen, comprising:

a demountable bezel, for mounting onto the display screen;

means carried by the bezel, for establishing a grid of light beams in front of the display screen;

means for determining the grid coordinates of an object placed proximate the face of the display screen to interrupt the light beam grid and mark a spot thereon;

means coupled to the grid coordinate determining means, for reporting the grid coordinates to the CPU; and a storage medium containing a program of instructions to be loaded into the computer system memory, for directing the CPU in execution of a bezel alignment procedure wherein coordinate transforms are generated to translate bezel grid coordinates to display screen coordinates.

2. The device of claim 1 wherein the demountable bezel comprises a rigid frame.

3. The device of claim 1 wherein the CPU under the direction of the program of instructions stored in memory:

displays a spot on the display screen at a location with known coordinates in the frame of reference of the display screen;

accesses the bezel grid coordinate reporting means, to obtain the coordinates of the spot on the display screen in the frame of reference of the bezel grid; and calculates the coordinate transforms to be applied to bezel grid coordinates to effectively align the bezel frame of reference to the display screen frame of reference.

4. A computer system comprising:
a central processing unit (CPU);
a memory accessed by the CPU;
a display screen coupled to the CPU, for visually displaying data from the CPU;
a demountable bezel, for mounting to the display screen;
means carried by the bezel, for establishing a grid of light beams in front of the display screen and for detecting an interruption of light beams in the grid;
means coupled to the light beam grid and detecting means, for determining the grid coordinates of an object placed proximate the face of the display screen to mark a spot thereon;
means coupled to the grid coordinate determining means, for reporting the grid coordinates to the CPU;
said CPU translating bezel grid coordinates to display screen coordinates in accordance with instructions stored in the memory.

5. The system of claim 4 wherein the light beam grid and detecting means comprises:
a plurality of light beam emitters and detectors arranged around the sides, top and bottom of the display screen, so that for each emitter there is a detector directly across from it on the opposite side of the screen.

6. The system of claim 5 wherein the light beam grid and detecting means further comprises:
a counter and decoder circuit for enabling multiple pairs of said emitters and detectors sequentially to provide multiple beams scanning across said display screen.

7. The system of claim 6 wherein the light beam grid and detecting means yet further comprises:
a circuit that detects the interruption of said beams.

8. The system of claim 7 wherein the grid coordinate determining means comprises:
means for registering the emitter and detector pairs enabled at the time of the interruption.

9. A touch-sensitive data input device for use with a display screen, comprising:
a plurality of light beam emitters and detectors;
means for mounting the emitters and detectors rigidly with respect to each other in an assembly removably mountable to a display screen;
said mounting means arranging the emitters and detectors around the top, sides, and bottom of the display screen so as to dispose each emitter directly across from a detector and on opposite sides of the screen;
a circuit for enabling multiple pairs of said emitters and detectors sequentially to produce multiple beams scanning across said display screen;
a detector circuit for detecting an interruption of said beams; and
an enclosure for the emitters and detectors made of a material having a light transmission spectrum matched to the emission spectrum of the emitters.

* * * * *